April 14, 1959     J. P. WILSON     2,881,472
SHEARING AND CUTTING APPARATUS FOR GELATINOUS MATERIAL
Filed Aug. 23, 1955     2 Sheets-Sheet 1
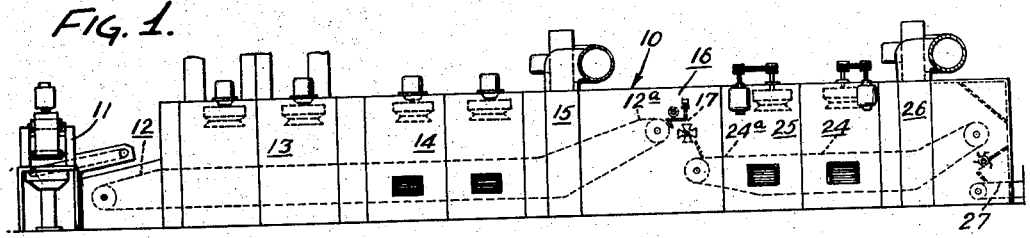
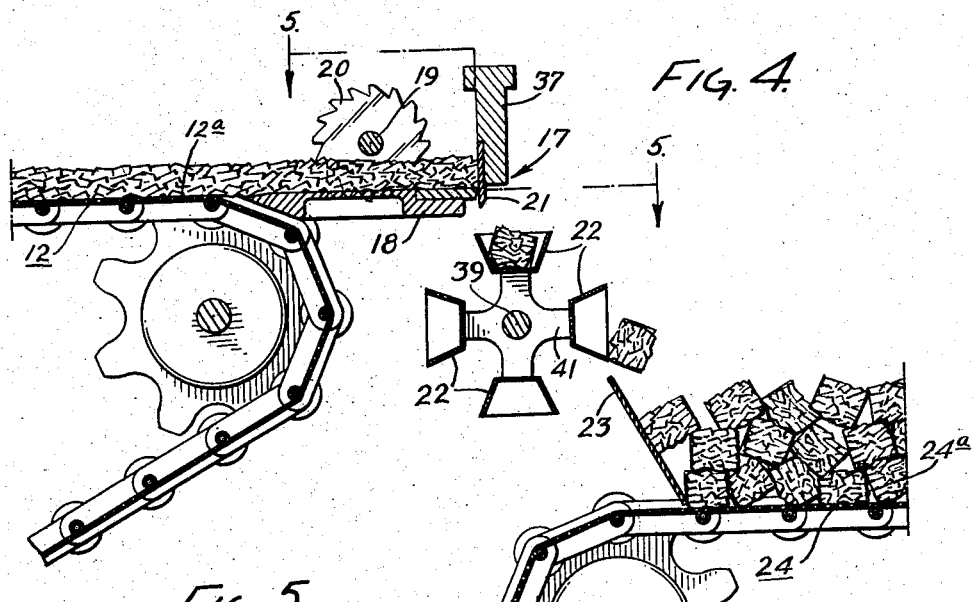
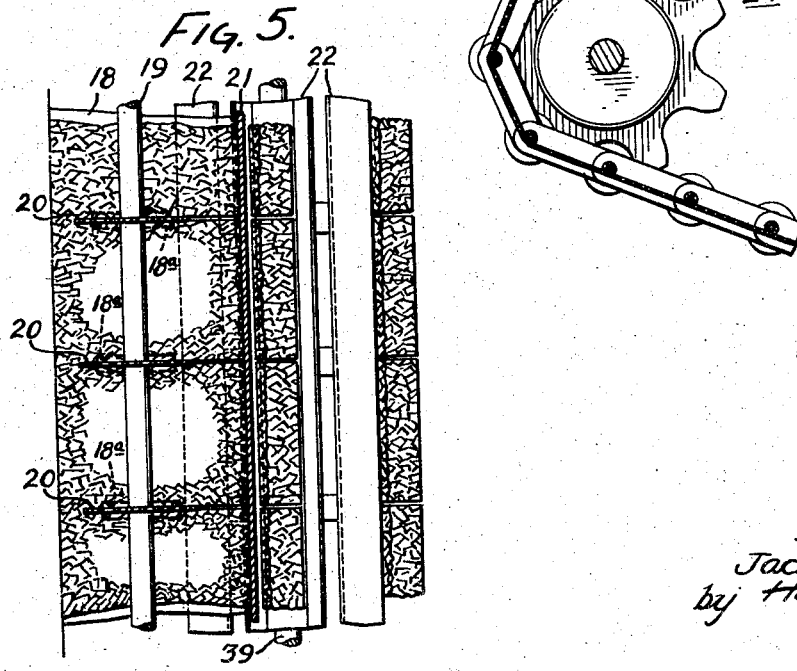
Inventor:
Jack P. Wilson
by Howson & Howson
Attys.

April 14, 1959  J. P. WILSON  2,881,472
SHEARING AND CUTTING APPARATUS FOR GELATINOUS MATERIAL
Filed Aug. 23, 1955  2 Sheets-Sheet 2

Inventor:
Jack P. Wilson
by Howson & Howson
Attys.

United States Patent Office 2,881,472
Patented Apr. 14, 1959

2,881,472

SHEARING AND CUTTING APPARATUS FOR GELATINOUS MATERIAL

Jack P. Wilson, Wynnewood, Pa., assignor to Proctor & Schwartz, Inc., Philadelphia, Pa., a corporation of Pennsylvania Application August 23, 1955, Serial No. 530,071

7 Claims. (Cl. 18—4)

The present invention relates to new and useful improvements in cutting and shearing apparatus for gelatinous material and more particularly to new and useful improvements in apparatus for cutting and shearing a continuous porous strip of partially dried gelatinous material as it is removed from one conveyor in a drier into uniform rectangular segments and depositing the segments on a second conveyor in a layer of uniform thickness.

The principal object of the present invention is to provide novel apparatus wherein gelatinous material, such as glue, may successively be jelled, dried, and prepared for further treatment or use without any manual handling of the material.

Another object of the present invention is to provide novel apparatus for forming a continuous porous belt-like strip of partially dried gelatinous material, such as glue, into uniform rectangular segments of the gelatinous material which may be easily handled, and completing the drying of the gelatinous material while in the rectangular segment form.

A further object of the present invention is to provide novel cutting and shearing apparatus operable to cut a continuous porous belt-like strip of partially dried gelatinous material, such as glue, into uniform rectangular segments and serve as an intermediate stage in a drying operation for the gelatinous material.

A still further object of the present invention is to provide novel cutting and shearing apparatus having the features and characteristics set forth which is of relatively simplified construction, may be manufactured easily and cheaply and is entirely efficient and effective in operation and use.

These and other objects of the present invention and the various features and details of the operation and the construction thereof are hereinafter more fully set forth and described in connection with the accompanying drawings, in which:

Fig. 1 is a side elevational view of drying apparatus for gelatinous material embodying the cutting and shearing apparatus of the present invention;

Fig. 4 is an enlarged fragmentary longitudinal sectional view illustrating the cutting and shearing apparatus of the present invention as it is used as an intermediate stage in a drying operation, and Fig. 5 is a sectional plan view taken on line 5—5, Fig. 4 illustrating the relative position of the apparatus for cutting and then shearing the gelatinous material.

Figure 2:
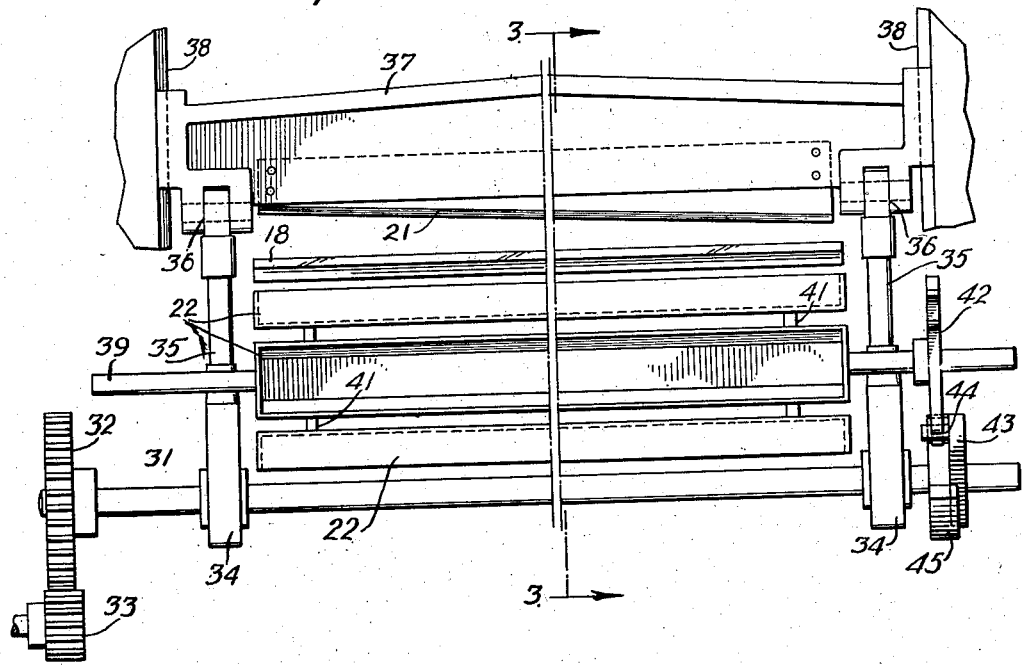
Fig. 2 is an enlarged front elevational view of the cutting and shearing apparatus of the present invention.

Referring more specifically to the drawings and particularly Fig. 1 thereof, reference numeral 10 designates generally a drier for gelatinous material which is constructed as shown and described more fully in a co-pending application for Scott, Fleming and Fink, entitled "Method and Apparatus for Drying Gelatinous Material," filed January 30, 1956 and assigned Serial No. 562,128, the above application being assigned to the assignee of the present application. Liquid gelatinous material, such as glue, is chilled and cut into small segments by chill roll cutting and feeding apparatus 11 similar to that shown in a co-pending application by Scott and Hoffman entitled, "Chill Roll Cutting and Feeding Apparatus and Method," filed March 19, 1954 and assigned Serial No. 417,460. The chilled pieces of the gelatinous material are deposited by the chill roll cutting and feeding apparatus onto a first foraminous conveyor 12 in the form of a continuous porous belt-like mass, and the conveyor 12 conveys the gelatinous material through first and second preliminary drying chambers 13 and 14 respectively, and then through a cooling chamber 15 wherein the partially dried gelatinous material is cooled. The discharge end 12a of the conveyor 12 then conveys the gelatinous material angularly upward in a transfer section 16 of the drier 10 to the cutting and chilling apparatus, designated generally as 17, of the present invention.

With reference to Fig. 4, the continuous porous belt-like strip of the gelatinous material is removed from the discharge end 12a of the conveyor 12 by means of a slotted doffer plate 18 and the gelatinous material passes horizontally over the flat upper surface of the doffer plate 18. Positioned above the doffer plate 18 in spaced parallel relation therewith and extending transversely with the drier 10 is a continuously rotating shaft 19 which carries a plurality of slow running milling-type saw blades 20 spaced uniformly along the axis of the shaft 19, for example as shown in Fig. 5. The saw blades 20 extend downwardly into slots 18a in the doffer plate 18 and cut the continuous porous belt-like strip of gelatinous material longitudinally into a plurality of narrow strips. The narrow strips of the gelatinous material are then forced outwardly to the edge of the doffer plate 18 where they are cut into rectangular segments of the porous gelatinous material by means of a vertically reciprocating shear blade 21.

In accordance with the present invention, the rectangular segments of porous gelatinous material are received in a transfer bucket 22 after they are cut by the saws 20 and shear blade 21 and transferred thereby over a guide plate 23 onto the feed end 24a of a second conveyor 24. The second conveyor 24 then conveys the rectangular segments of gelatinous material through a third drying chamber 25 and a cooling chamber 26 wherein the drying of the gelatinous material is completed. The dried gelatinous material is then deposited by the second conveyor 24 onto a discharge conveyor 27 which conveys the dried gelatinous material to further storage or treating apparatus.

Figure 3:
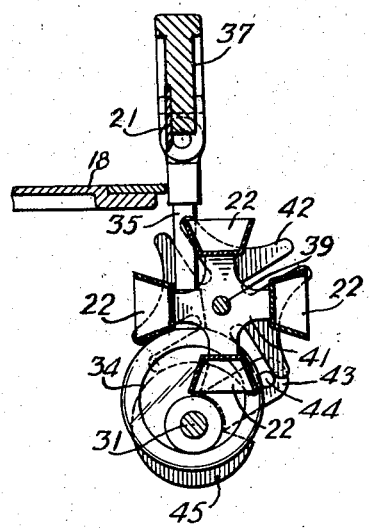
Fig. 3 is a transverse sectional view taken on line 3—3, Fig. 2 illustrating the drive mechanism for the cutting and shearing apparatus.

With reference to Figs. 2 and 3, the vertically reciprocating shear blade 21 and transfer buckets 22 are driven by common drive mechanism so that a bucket 22 is always in position beneath the shear blade 21 during downward movement of the shear blade. To accomplish this, a drive shaft 31 extends transversely of the drier and is continuously driven in the counter clock-wise direction, relative to Fig. 3, by means of a gear 32, pinion 33 and conventional drive mechanism (not shown). Secured to the drive shaft 31 intermediate its opposite end portions is a pair of eccentrics 34, 34 which have tie rods 35, 35 extending upwardly therefrom. The tie rods 35, 35 in turn are pivotally secured as indicated at 36, 36 to a bracket 37 slidably mounted on slides 38, 38 at opposite sides of the drier 10. The bracket 37 supports the shear blade 21 with one edge of the shear blade in advance of the opposite edge to produce a shearing action on the gelatinous material being cut, as shown in Fig. 2. In addition, the transfer buckets 22 are positioned at 90 degree intervals about a shaft 39 extending transversely of the drier 10 beneath the shear blade 21 and are held in position by means of a pair of four pronged supporting plates 41, 41 at opposite sides of the shaft 39.

Secured to the shaft 39 and rotatable therewith is a Geneva wheel 42 which is part of a conventional Geneva drive mechanism and is rotatably driven intermittently in the clockwise direction relative to Fig. 3 by a crank arm 43 and pin 44 carried by the drive shaft 31. A positioning plate 45, formed as part of the Geneva drive mechanism, maintains the Geneva wheel 42 in predetermined positions when it is not being driven and maintains the upper transfer bucket 22 in a position immediately beneath the shear blade 21, for example as shown in Fig. 4, to receive the cut and sheared segments of gelatinous material from the doffer plate 18. By this construction, during each revolution of the drive shaft 31 a plurality of segments are cut and sheared from the continuous porous strip of gelatinous material, deposited in a transfer bucket, and then dropped by the transfer bucket into engagement with the guide plate 23, and thence onto the conveyor 24 to form a layer of gelatinous material of uniform thickness composed of a plurality of rectangular segments of gelatinous material on the foraminous conveyor 24.

From the foregoing it will be apparent that the present invention provides novel cutting and shearing apparatus for gelatinous material which may be used as an intermediate stage in the drying operation for gelatinuous material, and cut and shear a continuous porous flat belt of gelatinous material into a plurality of uniform rectangular segments and then deposit such segments of the gelatinous material on a conveyor in a layer of uniform thickness.

While particular embodiments of the present invention have been illustrated and described herein it is not intended to limit the invention to such a disclosure and changes and modifications may be incorporated and embodied therein within the scope of the following claims.

We claim:

1. In drying apparatus for gelatinous material comprising a dryer housing and first and second conveyors operable to convey the gelatinous material longitudinally through said dryer housing; means operable to deposit the gelatinous material on one end of said first conveyor in a continuous porous mass of uniform thickness, at least one cutting member mounted upwardly adjacent the discharge end of said first conveyor operable to engage said continuous porous mass of material and cut the same into plurality of strips, a shear blade mounted for reciprocal movement vertically between upper and lower limit position adjacent said cutting member and operable during movement to its lower limit position to engage said strips of material and cut the same into generally rectangular uniform segments, a transfer bucket mounted adjacent the discharge end of said first conveyor and movable from a first position beneath said shear blade wherein it receives said cut segments of material to a second position removed from said shear blade wherein it deposits said cut segments of material on said second conveyor, and drive means operable to actuate said transfer bucket between said first and second positions, said drive means being operatively connected with said shear blade and actuatable after said shear blade reaches its lower limit position to cause said transfer bucket to move from said first position to said second position.

2. In drying apparatus for gelatinous material comprising a dryer housing and first and second conveyors operable to convey the gelatinous material longitudinally through said dryer housing; means operable to deposit the gelatinous material on one end of said first conveyor in a continuous porous mass of uniform thickness, a doffer plate extending transversely of said drier housing adjacent the other end of said first conveyor operable to engage and remove said material from said first conveyor, means defining a plurality of longitudinally extending slots in said doffer plate uniformly spaced transversely of said doffer plate, a plurality of continuously rotating saw blades corresponding in number to said plurality of slots mounted upwardly adjacent said doffer plate and extending downwardly into said slots operable to engage said continuous porous mass of material and cut the same into a plurality of strips, a shear blade mounted for reciprocal movement vertically between upper and lower limit positions rearwardly adjacent said doffer plate and operable during movement to its lower limit position to engage said strips of material and cut the same into generally rectangular uniform segments, means to receive said cut segment of material and deposit on said second conveyor, and drive mechanism for said shear blade and said receiving means operable to actuate said shear blade to its lower limit position and thereafter actuate said receiving means to cause the same to deposit the cut segments of material on said conveyor.

3. In drying apparatus for gelatinous material comprising a dryer housing and first and second conveyors operable to convey the gelatinous material longitudinally through said dryer housing; means operable to deposit the gelatinous material on one end of said first conveyor in a continuous porous mass of uniform thickness, a shear blade mounted for reciprocal movement vertically between upper and lower limit positions rearwardly adjacent the discharge end of said first conveyor and operable during movement to its lower limit position to engage said material and cut the same into generally uniform segments, an intermittently rotating shaft mounted transversely of said drier housing beneath the path of travel of said shear blade, a plurality of transfer buckets rotatable with said shaft operable to receive the cut segments and deposit the same on said second conveyor, and drive mechanism for said shear blade and said shaft operable to actuate said shear blade to its lower limit position and thereafter rotate said shaft one step to cause the transfer buckets to deposit the cut segments of material on said second conveyor.

4. In drying apparatus for gelatinous material comprising a dryer housing and first and second conveyors operable to convey the gelatinous material longitudinally through said dryer housing; means operable to deposit the gelatinous material on one end of said first conveyor in a continuous porous mass of uniform thickness, a doffer plate extending transversely of said drier housing adjacent the other end of said first conveyor operable to engage and remove said material from said first conveyor, means defining a plurality of longitudinally extending slots in said doffer plate uniformly spaced transversely of said doffer plate, a plurality of continuously rotating saw blades corresponding in number to said plurality of slots mounted upwardly adjacent said doffer plate and extending downwardly into said slots operable to engage said continuous porous mass of material and cut the same into a plurality of strips, a shear blade mounted for reciprocal movement vertically between upper and lower limit positions rearwardly adjacent said doffer plate and operable during movement to its lower limit position to engage said strips of material and cut the same into generally rectangular uniform segments, an intermittently rotating shaft mounted transversely of said drier housing beneath the path of travel of said shear blade, a plurality of transfer buckets rotatable with said shaft operable to receive the cut segments of material and deposit the same on said second conveyor, and drive mechanism for said shear blade and said shaft operable to actuate said shear blade to its lower limit position and thereafter rotate said shaft one step.

5. Apparatus for cutting gelatinous material comprising first and second conveying means and means to deposit a porous mass of material on said first conveying means, a shear blade mounted for reciprocal movement vertically between upper and lower limit positions adjacent the discharge end of said first conveying means and operable during movement to its lower limit position to engage said material and cut the same into generally uniform segments, a transfer bucket mounted adjacent the discharge end of said first conveying means and movable from a first position beneath said shear blade wherein it receives said cut segments of material to a second position removed from said shear blade wherein it deposits said cut segments of material on said second conveying means, and drive means operable to actuate said transfer bucket between said first and second positions, said drive means being operatively connected with said shear blade and actuatable after said shear blade reaches its lower limit position to cause said transfer bucket to move from said first position to said second position.

6. Apparatus in accordance with claim 5 wherein at least one cutting member is mounted upwardly adjacent the discharge end of said first conveying means operable to engage and cut material thereon into a plurality of strips, said shear blade operable to cut said strips into a corresponding plurality of segments simultaneously, and the transfer bucket operable to receive all of said plurality of segments.

7. Apparatus for cutting material comprising first and second conveying means and means to deposit a mass of material on said first conveying means, a doffer plate extending transversely adjacent the discharge end of said first conveying means operable to engage and remove said material therefrom, means defining a plurality of longitudinally extending slots in said doffer plate uniformly spaced transversely of said doffer plate, a plurality of cutting members corresponding in number to said plurality of slots mounted upwardly adjacent said doffer plate and extending downwardly into said slots operable to engage said material and cut the same into a plurality of strips, a shear blade mounted for reciprocal movement vertically between upper and lower limit positions rearwardly adjacent said doffer plate and operable during movement to its lower limit position to engage said strips of material simultaneously and cut the same into a plurality of generally rectangular uniform segments, a transfer bucket mounted adjacent the discharge end of said first conveying means and movable from a first position beneath said shear blade wherein it receives said cut segments of material to a second position removed from said shear blade wherein it deposits said cut segments of material on said second conveying means, and drive means operable to actuate said transfer bucket between said first and second positions, said drive means being operatively connected with said shear blade and actuatable after said shear blade reaches its lower limit position to cause said transfer bucket to move from said first position to said second position.

References Cited in the file of this patent

UNITED STATES PATENTS

| | | |
|---|---|---|
| 644,810 | Sylvester | Mar. 6, 1900 |
| 807,413 | Baker | Dec. 12, 1905 |
| 894,461 | Pullen | July 28, 1908 |
| 1,288,868 | Gabriel | Dec. 24, 1918 |
| 1,880,110 | Shapiro | Sept. 27, 1932 |
| 1,902,755 | Biggs | Mar. 21, 1933 |
| 1,980,898 | Abernethy | Nov. 13, 1934 |
| 2,284,848 | Ryan | June 2, 1942 |
| 2,295,246 | Weida | Sept. 8, 1942 |
| 2,327,943 | Tiers | Aug. 24, 1943 |
| 2,546,867 | Peck | Mar. 27, 1951 |
| 2,604,057 | Rhodes | July 22, 1952 |
| 2,616,501 | Smith | Nov. 4, 1952 |
| 2,712,800 | Harris | July 12, 1955 |
| 2,733,577 | Roth | Feb. 7, 1956 |